United States Patent [19]

Haegeman

[11] Patent Number: 4,540,528

[45] Date of Patent: * Sep. 10, 1985

[54] APPARATUS FOR MIXING GAS AND LIQUID

[76] Inventor: Johny H. Haegeman, 122, Steenweg naar Alsemberg, B 1510 Buizingen, Belgium

[*] Notice: The portion of the term of this patent subsequent to Aug. 24, 2001 has been disclaimed.

[21] Appl. No.: 644,898

[22] Filed: Aug. 28, 1984

Related U.S. Application Data

[63] Continuation-in-part of Ser. No. 456,452, Jan. 7, 1983, Pat. No. 4,468,358, which is a continuation of Ser. No. 278,232, Jun. 29, 1981, abandoned.

[30] Foreign Application Priority Data

Jul. 8, 1980 [BE] Belgium .............................. 0/201326

[51] Int. Cl.³ .............................................. B01F 3/04
[52] U.S. Cl. ...................................... 261/91; 210/219; 239/219; 261/120; 366/279; 415/7; 416/85; 416/188; 416/234; 417/61
[58] Field of Search ........... 261/89, 91, 120, DIG. 79; 366/249, 279; 210/219, 221.1, 242.2; 209/169, 170; 239/219, 221; 415/7; 416/85, 188, 234, 244 B; 417/61

[56] References Cited

U.S. PATENT DOCUMENTS

| | | | |
|---|---|---|---|
| 2,346,366 | 4/1944 | Durdin, 3rd | 210/219 X |
| 2,465,671 | 3/1949 | Van Millingen et al. | 416/188 |
| 3,416,729 | 12/1968 | Ravitts et al. | 261/91 X |
| 3,669,422 | 6/1972 | Nogaj | 261/91 X |
| 3,735,926 | 5/1973 | Ravitts | 261/91 X |
| 3,871,581 | 3/1975 | Dively | 261/91 X |
| 3,911,065 | 10/1975 | Martin et al. | 261/91 |
| 4,093,401 | 6/1978 | Gravelle | 416/188 |
| 4,193,951 | 3/1980 | Stanley | 261/91 |
| 4,468,358 | 8/1984 | Haegeman | 261/91 |

FOREIGN PATENT DOCUMENTS 2409549  9/1975  Fed. Rep. of Germany .

*Primary Examiner*—Richard L. Chiesa
*Attorney, Agent, or Firm*—Pollock, Vande Sande and Priddy

[57] ABSTRACT

Apparatus for mixing air with liquid, an aerator or oxygenator, comprises a motor or other power drive generally mounted in vertical position on a floating or a fixed structure, the motor having a shaft extending downwards through an opening in the center area of the float or fixed structure and bearing on its lower part a screw pump portion located in a cylindrical volute section just below the water level. When the apparatus is operating, the waste-water is sucked by means of the screw pump from the bottom of the body of liquid at which the apparatus is positioned and is pushed upwards in order to be diffused by means of a centrifugal impeller having outwardly curved blades, at least one of which extends downward to merge with a spiral shaped portion of a blade on the screw pump. Increased efficiency of the apparatus as an aerator is achieved, allowing the exit velocity from the centrifugal impeller to be approximately equal to, or even greater than, the upward velocity through the screw pump portion, by increasing the kinetic energy of the fluid during passage through the centrifugal impeller or at least minimizing losses of kinetic energy. The resulting high exit velocity from the centrifugal impeller produces higher aerator efficiencies than have been achievable with prior art devices.

6 Claims, 5 Drawing Figures

APPARATUS FOR MIXING GAS AND LIQUID

CROSS-REFERENCE TO RELATED PATENT APPLICATIONS

This application is a continuation-in-part of Ser. No. 456,452 filed Jan. 7, 1983, now U.S. Pat. No. 4,468,358 which was a continuation of Ser. No. 278,232 filed June 29, 1981 and now abandoned.

DESCRIPTION

TECHNICAL FIELD

The present invention relates to an apparatus for mixing a gas such as air with liquid and, vice versa, for removing a gas from a liquid. More particularly, the invention relates to application of such an apparatus as a surface aerator in a water purification plant to provide the required oxygen transfer for biological purification of waste water and simultaneously to remove the carbon dioxide produced during the oxidation of the organic material in the waste water.

BACKGROUND ART

A surface aerator generally comprises a power motor mounted on a float or a rigid structure of a purification plant. The motor drives a shaft provided with impeller means such as a paddle wheel or a propeller generally combined with a static diffusion or deflection head. There are several kinds of aerators among which one can make a distinction between low speed aerators (about 60 rev/min) and high speed aerators (about 700–1800 rev/min).

A low speed aerator mainly comprises an impeller shaped as a conical paddle wheel having a large diameter, a part of which extends below the surface level of the water and which is driven by an electric motor through a speed-reducing gear. The efficiency of such aerators is very good in clean water.

High speed aerators are provided with a propeller shaft directly connected to the motor. The water is forced upwardly at high speed by a marine-type propeller and is diffused at a considerable angle above horizontal by a static deflector or by a trailing edge. According to their application, these aerators have more or less good efficiency in water loaded with sludge.

In such prior art devices, an impeller such as a simple marine-type propeller has been rotated beneath the surface of the liquid to cause the liquid to rise through a surrounding, downwardly extending volute. The upward flow has then been directed against a rotating or stationary diffusion head which has deflected the liquid into a flow path extending at a considerable angle above horizontal. As a result of this type of prior art deflection, the velocity of the liquid leaving the diffuser head has actually been less than its upward velocity through the volute, leading to a loss in kinetic energy and a short flight path for the liquid after leaving the diffuser. The liquid has tended to break into a rather coarse spray, also. As a result, the rate of oxygen transfer to the liquid has been less than desired and the energy consumption by the pump motor has been too high for a given degree of purification.

In other prior art devices, a further paddle-wheel deflector has been mounted above the propeller and on the same shaft, but above the water line. In this case, the stream of water leaving the volute encounters the paddle wheel blades, which also deflect the water away as a rather course spray into a flow path extending at a considerable angle above horizontal. The liquid hitting the blades on the deflection paddle wheel has undergone a sort of hydraulic shock as it has been forced abruptly to change directions, again leading to a loss of kinetic energy and a short flight path for the liquid after leaving the deflection paddle wheel.

Other prior art attempts to improve the performance of surface aerators have involved the use of various types of stationary and spinning nozzles which have opened toward the periphery of the aerator and through which the upwardly moving liquid has been deflected to depart from the aerator as a fast moving stream, rather than a spray, into a flow path extending at a considerable angle above horizontal. Because the liquid has left the nozzle as a stream rather than a spray, the rate of oxygen transfer has been less than desired.

Concerning the efficiency of such prior art apparatuses, care must be taken to distinguish between the efficiency of the aerator as a pumping device, which might be stated in terms of volume of liquid pumped per kilowatt hour; and the efficiency of the aerator as an aerator, which might be stated in terms of volume of oxygen added to the liquid per kilowatt hour. While an aerator may be found to have good efficiency as a pump, it does not follow at all that it will have good efficiency as an aerator.

DISCLOSURE OF THE INVENTION

The purpose of the present invention is to improve the efficiency, both as aerators and as pumps, of directly driven high speed aerators and to provide the possibility to adjust these high levels of efficiency to the different kinds of applications according to the loading degree of the waste water.

An apparatus according to the invention comprises impeller means fitted on the motor shaft, the impeller means having a lower part shaped as a screw pump which sucks the liquid in an axially upward stream and an upper part shaped as a centrifugal impeller with blades which gradually impart a horizontal component of movement to the stream of liquid. In the preferred form of the invention, the lower and upper parts of the impeller are joined together to form one single body.

The blades of the centrifugal impeller are hydrodynamically shaped so as to collect the streams of liquid flowing axially upward from the screw pump and to gradually bend these streams into a radial direction to obtain a horizontal component of the path of movement. The centrifugal impeller blades could be connected, or not, to a diffusion head or deflector.

Intensive testing of prior art high speed aerators and those embodying the present invention has shown that efficiency as an aerator increases with the increasing uptake rate of the aerated fluid content. The present invention allows adaptation of the impeller to the real uptake rate, which is expected to increase in the future as more efficient microorganisms become available to treat waste water. The size and power required to operate each independent impeller portion of the invention can be chosen to correspond to an optimum efficiency for each intended application as a function of the real oxygen uptake rate of the fluid content expressed in milligrams of oxygen per liter of aeration basin volume per hour (mg.l.h.). For example:

(a) In an aerated lagoon, in a very low and low-loaded activated sludge system generally showing oxygen uptake rates of 1 up to about 20 mg/l.h., increasing the energy given to the pump and reducing the energy to the centrifugal portion; the total energy can be split into 50 percent or more for the pump and 50 percent or less for the centrifugal portion;

(b) In a medium loaded activated sludge system generally showing oxygen uptake rates of 20 up to 60 mg/l.h., giving slightly more energy to the centrifugal portion than to the pump portion; and (c) In a high loaded activated sludge system generally showing oxygen uptake rates of 60 up to 200 mg/l.h., increasing even more the energy to the centrifugal portion.

The present invention embodies various features and achieves certain advantages not found in the prior art, such as:

(a) A compact, single body impeller permits a reduction in the length of the motor shaft or any extension joined to the motor shaft by a rigid or flexible coupling. This reduction in length diminishes the radial forces on the motor shaft, and thus diminishes the radial forces on the motor bearings and increases the life of the overall apparatus.

(b) A high velocity of horizontally projected liquid is achieved which cannot be obtained in prior art direct drive aerators. This high velocity of liquid makes it possible to project the liquid very near to the surface of the liquid body, and to achieve a much higher aerating effect due to the small impact angle of the projected liquid on the surface.

(c) Propellers generally used in prior art aerators have a limited peripheral speed with a maximum of 27 m/sec. Any attempt to exceed this speed causes a major drop in pumping efficiency and, thus, a drop in overall aerating efficiency. For this reason, the velocity of the liquid which is being pumped vertically upward is limited to about 4 to 7 m/sec. The actual exit velocity of the liquid is even lower due to both the rather abrupt change of the direction of the liquid by the diffusion head and the significant pressure loss which occurs in the increasing exit section of the diffusion head. This increase in the area of the exit section of prior art high speed aerators could not be avoided following a ninety degree bend since a reduction in the area of the exit section to increase exit velocity would produce high friction losses and clogging of the exit section. While the apparatus of the present invention achieves a vertical liquid velocity in the screw pump portion of the impeller which is similar to that achieved in the propeller parts of existing aerators, the invention has the very important property of continuously, smoothly accelerating the liquid stream as the stream flows toward the centrifugal outlet of the impeller. As a result, the exit velocity of the liquid is not limited in the apparatus of the present invention to the conditions discussed above. The displaced liquid is continuously guided by the screw pump and impeller blades, and these blades gradually increase the horizontal component of the velocity of the liquid as the liquid is pumped toward the horizontal outlet, after which the liquid is projected onto the surface of the liquid body with a small impact angle.

(d) A small impact angle is achieved with the present invention as a result of the considerations discussed above and causes the projected liquid to deflect or bounce from the surface of the liquid body. This creates the unexpected effect of producing an increased area of disturbance on the surface which improves the transfer of oxygen to the liquid.

BRIEF DESCRIPTION OF THE DRAWINGS

Other particular features and advantages of the invention will be described in greater detail in the following description referring to the accompanying drawings in which.

BEST MODE FOR CARRYING OUT THE INVENTION

Figure 1:
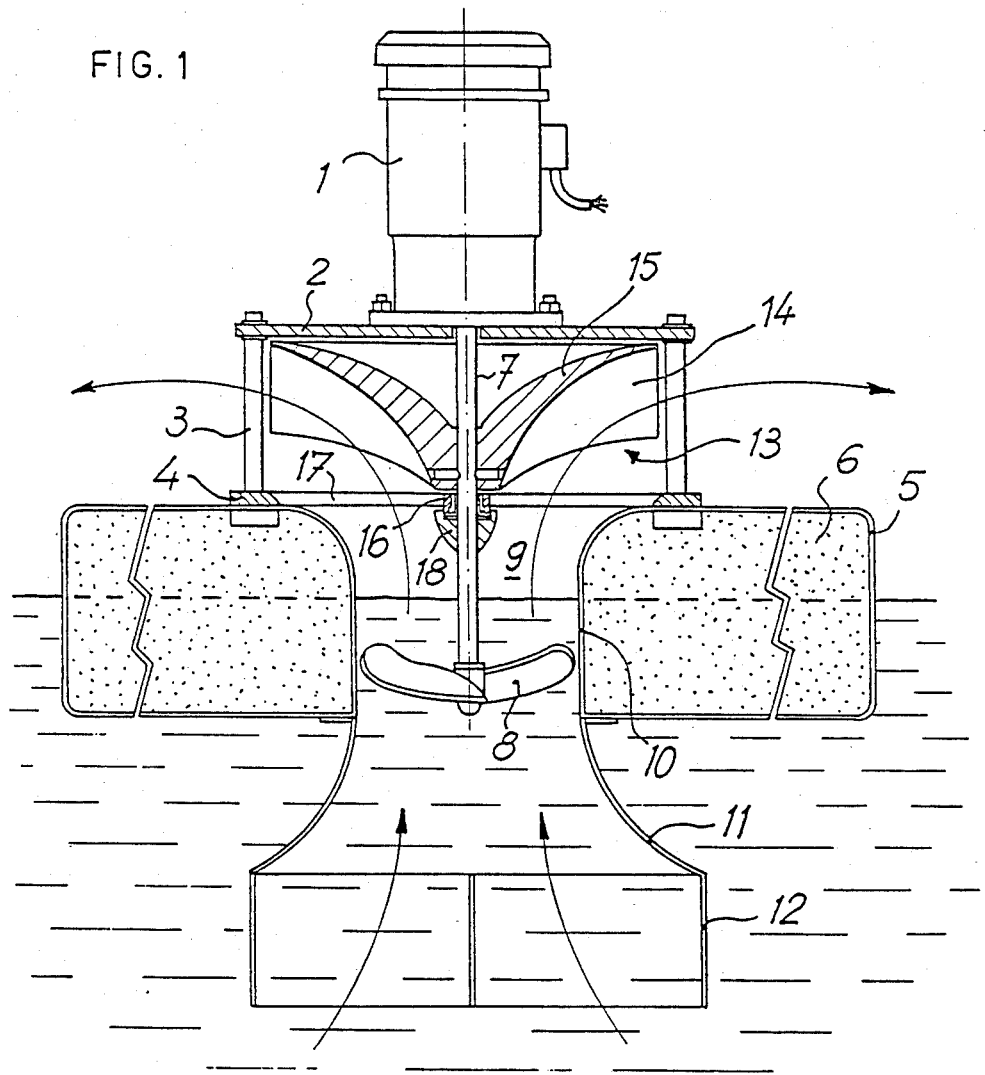
FIG. 1 is a sectional schematic view showing an apparatus according to the invention.

FIG. 1 shows an apparatus provided with an electric motor 1 or other power drive mounted on a bearing plate 2 supported by circumferentially positioned spacers 3 on a mounting ring 4. Ring 4, in its turn, is fixed on the upper portion of a float 5. The float 5 conventionally comprises a shell of metal or fiberglass polyester filled with polyurethane foam 6.

At the lower end of the motor shaft 7, there is fixed a marine-type propeller 8 which extends to a level below the surface level of the water through an opening 9 provided in the float 5 or between the floats if several floats are provided.

Around the screw propeller 8 there is arranged a cylindrical intake volute section or housing 10 which is provided at its lower end with an intake cone 11. Optionally, intake cone 11 may include a transverse stabilizer 12 having a cruciform or any other suitable shape. The upper edge of the cylindrical intake volute section 10 preferably is flared outwardly to improve the hydraulical passageway.

According to the invention, the shaft 7 also is provided with a centrifugal or aerator impeller 13 comprising essentially hydrodynamical blades 14 and an upwardly and outwardly flared deflection or diffusion head 15. As illustrated, blades 14 extend radially beyond the tips of the blades of screw propeller 8. As a result of this configuration, the exit velocity of the liquid leaving blades 14 can be caused to exceed the axial velocity of the liquid flowing upward through volute section 10 so that the kinetic energy of the liquid actually increases as it is moved up and out. However, good performance can be achieved when the tip diameters are nearly the same. In either event, however, the axial height of blades 14 at their tips and the axial spacing between bearing plate 2 and mounting ring 4 must be chosen so as to optimize the horizontal component of the velocity of the liquid leaving the apparatus. In general, when the diameter of blades 14 is larger than the tip diameter of propeller 8, the previously mentioned axial height and spacing can be made larger than would produce efficient aeration when the tip diameter of blades 14 is more or less equal to, or even somewhat less than, the diameter of propeller 8. In the former case, higher horizontal velocity permits the use of a relatively larger discharge opening without an unacceptable loss in kinetic energy. In the latter case, lower horizontal velocity at the tips of blades 14 is increased by the use of a relatively smaller discharge opening acting more or less as a nozzle. The objective in either case is to achieve the maximum horizontal kinetic energy so that efficiency as an aerator will be optimized.

For supporting the relatively long motor shaft 7 provided in this embodiment, there may be provided a bearing located in an anti-deflection ring 16 connected through arms 17 with the stationary mounting ring 4. For reducing the resistance encountered by the water when propelled upwardly against the anti-deflection ring 16, there is provided on the lower side of the ring 16 a hydraulical deflector 18. Driving of the movable part or parts by the motor can be effected by means of a single piece shaft or by coupling means.

In operation of the apparatus, the propeller 8 acts as an axial pump which propels the liquid upwardly with a vector velocity $\overline{V}_1$. This velocity need not be as important as with known high speed surface aerators but has to be sufficiently high to bring the liquid to the level of the centrifugal impeller 13. A centrifugal impeller has at its periphery a well determined peripheral vector velocity $\overline{V}_2$. The blades 14 must be made such that they receive the vertically rising liquid streams and bend them gradually to a spiral so as to obtain an optimum horizontal velocity at the outlet. In theory, the value of the outlet vector velocity $\overline{V}_R$ has to correspond with the resultant velocity of the vertical stream $\overline{V}_1$ and peripheral velocity $\overline{V}_2$ of the impeller 13; that is, $$\overline{V}_R = \overline{V}_1 + \overline{V}_2.$$

The magnitude of $\overline{V}_R$ will vary depending on the radial and axial location at which a given water droplet leaves the impeller. A droplet leaving near the center of the impeller will travel at about $\overline{V}_1$; whereas, one leaving near the tip of a centrifugal blade will travel at about $\overline{V}_R$. Droplets leaving between these extreme points will travel at velocities between $\overline{V}_1$ and $\overline{V}_R$. The droplets are thrown out at a plurality of velocities and at different heights of the centrifugal impeller 13; thus, they travel at different heights above the water surface. Consequently, the droplets will hit the water surface at a plurality of radial distances from the center of the impeller, thereby maximizing the aeration effect.

Figure 2A:
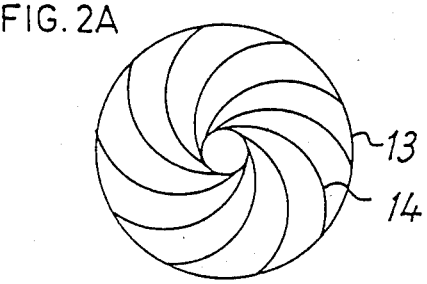
FIG. 2A and 2B represent embodiments of the centrifugal impeller.
Figure 2B:
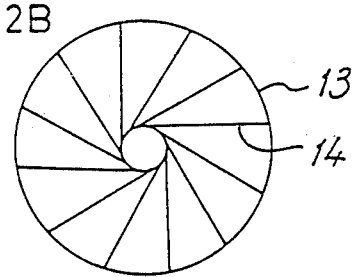

According to the preferred embodiments, the blades 14 should have more or less simplified shapes as shown in FIG. 2A in which the velocities of hydrodynamical streams should follow as much as possible the equation shown above. And it would be possible to adopt straight blades disposed tangentially as shown is FIG. 2B, with which a lower yield is obtained while simplifying the construction.

Both component parts of the impeller may be dimensioned separately in order to accentuate either the pumping function or the aerating function. Thanks to this possibility, the aerator may readily be adapted to the precise application, as follows:
(a) With very low and low-loaded sludges, the stress is primarily on the function of pumping or mixing and the power needed for pumping substantially exceeds the power needed for aeration;
(b) With medium-loaded activated sludges, the poweer needed for pumping is practically equal to the power needed for aeration; so that, the available power may be divided into equal parts between the propeller pump and the centrifugal impeller; and
(c) With highly-loaded activated sludges, the stress is primarily on aeration and the power needed for aeration substantially exceeds the power needed for pumping; so that, the dimensions of the centrifugal impeller are more important than those of the propeller pump. In the extreme case one could contemplate the application of an aerator with only the centrifugal portion.

Figure 3:
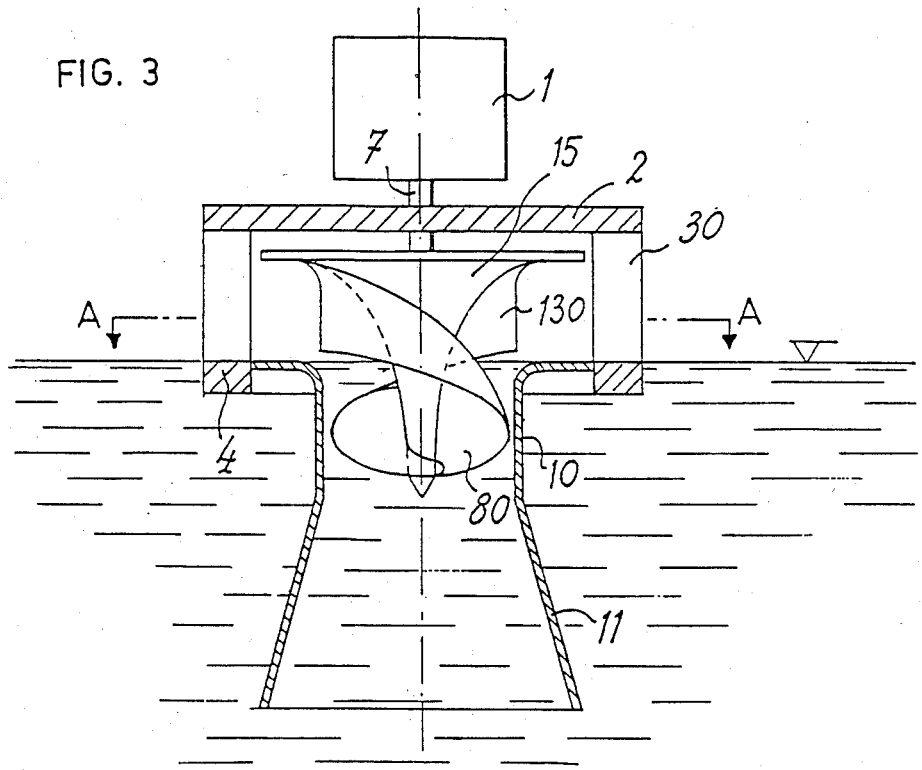
FIG. 3 is a longitudinal section of a preferred embodiment.
Figure 3A:
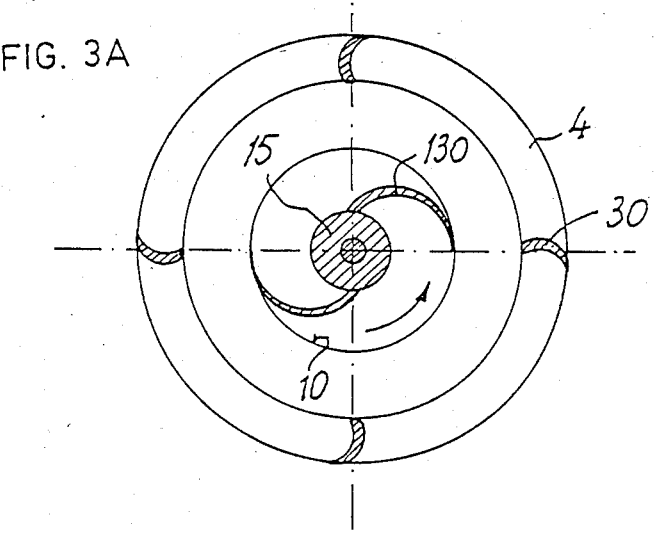
FIG. 3A is a section along line A—A of FIG. 3.

The preferred embodiment of the invention is shown in FIGS. 3 and 3A, in which the same elements are referred to with the same reference numerals. A screw pump 80 having one or more blades and a centrifugal impeller or aerator 130 also having one or more blades, are combined into one single impeller body. The screw pump 80 extends to a level below the surface of the water and sucks water axially upwardly through the cone 11 and the cylindrical intake volute section 10. Preferably, the screw pump 80 has an essentially constant diameter upper section which is at least one full pitch in axial length. Screw pump 80 preferably also includes a tapered lower section having a length of about three-eights of a pitch, over which the screw pump blade (or blades) tapers from a maximum upper diameter within volute section 10 to a minimum lower diameter at the hub of the screw. Such a tapered lower section helps prevent clogging. This overall length is about four times that of prior art marine-type screw propellers and results in improved pumping efficiency. The screw pump also may be arranged as a self-priming pump and placed completely or partly above the surface of the water. At least one of the blades of the screw pump 80 gradually curves upward into a spiral, as shown in FIG. 3, to merge into and form at least one of the blades of the centrifugal impeller 130. Thus, the liquid pumped by screw pump 80 is continuously guided upward to the centrifugal impeller while the liquid is confined circumferentially by the volute section 10, so that less flow is lost and reduced turbulence is generated, compared to prior art high speed aerators.

The aerator or centrifugal impeller portion 130 having hydrodynamical blades similar to blades 14 shown in FIGS. 1 and 2, is located above the screw pump 80 and tends to bend the axially streaming water gradually towards a horizontal direction where the water is dispersed onto the surface level of the water by centrifugal force. Preferably, the blades of the impeller portion 130 have an axial length of about one-half of a pitch of the impeller portion. The impeller portion also may optionally be located completely or partly under the surface level. According to an important feature of this embodiment, water is continuously guided from vertical suction in volute section 10 up to substantially horizontal dispersion from impeller portion 130, thereby improving efficiency as an aerator. As illustrated, and as in the embodiment of FIG. 1, the exit diameter of the centrifugal impeller portion 130 is somewhat greater than that of the screw pump 80, so that the kinetic energy of the liquid is increased, or at least maintained, as it is moved up and out. However, as discussed with regard to the geometry of the blades 14 shown in FIGS. 1 and 2, the exit or tip diameter of the blades of impeller 130 may be essentially equal to or even slightly smaller than the diameter of screw pump 80 and good aeration efficiency will still be obtained, provided the discharge opening is not too large. Alternatively, the tip diameter of the centrifugal portion can be made essentially equal to the diameter of the screw pump without an unacceptable drop in efficiency as an aerator, provided the centrifugal effect is achieved over a reduced portion of the pitch of the spiral blades in the centrifugal portion, compared to the portion of the spiral pitch used for the centrifugal portion when the tip diameter of the centrifugal portion is greater than the diameter of the screw pump. In such a case, the spiral will end more quickly and efficiency as an aerator will be reduced somewhat.

It is also possible to provide that the water shall only be bent partly in the centrifugal impeller and diffused towards the horizontal path of movement by means of a stator or fixed deflector. In such an embodiment, the spacers 30 connecting the bearing plate 2 with the mounting ring 4 preferably are shaped as inverting blades to partly collect the water which goes out at a well determined angle so as to form a reaction against the component movement created by the centrifugal outlet force of the water. By this arrangement one avoids the situation where the float or its mounting structure are subjected to a continuous stress.

The apparatus according to the invention accordingly performs two functions by a single direct drive; that is:

(a) Pumping or mixing the fluid in the purification station by applying the principle of an axial screw pump which is perfectly adapted to a very high flow rate and small elevation height, though care should be taken to keep the lowermost possible axial velocity of the water to obtain high efficiency; and (b) Aerating or dispersing with feeding of oxygen by applying the principle of a centrifugal turbine with a gradually opening conical wheel or impeller, provided with blades to bend the streams of water from vertical to horizontal direction, thereby obtaining a fluid outlet speed which is substantially higher than that of conventional aerators turning at high speeds, resulting in a higher efficiency.

The apparatuses described hereabove only are examples of embodiment of the invention and various modified embodiments are possible without however departing from the scope of the appended claims.

Having described my invention in sufficient detail to enable those skilled in the art to make and use it, I claim as new and desire to receive Letters Patent for:

1. An improved apparatus for aeration of a body of liquid such as a body of waste water, said apparatus comprising:
   a top-mounted power drive having a rotatable shaft extending downwardly toward the surface of said body of liquid; and
   an impeller mounted on said shaft for rotation therewith at the surface level of said body of liquid, said impeller comprising an upwardly, outwardly flared diffusion head forming an impeller body having a lower, axial flow inducing, screw pump portion with at least one blade, said at least one blade being mounted on the lower end of said diffusion head for drawing liquid from said body of liquid and pumping said liquid axially upward at a first velocity; said impeller body also having an upper, centrifugal flow inducing portion with at least one radially outwardly curved blade, said at least one curved blade being mounted on said diffusion head for receiving said liquid pumped axially upward by said screw pump portion and for centrifugally expelling said liquid outwardly from said impeller at a second velocity and at a position above the surface of said body of liquid, said at least one blade of said screw pump portion being gradually curve into a spiral to merge into and form said at least one blade of said centrifugal flow inducing portion, whereby said liquid pumped axially upward by said screw pump portion into said centrifugal flow inducing portion is continuously guided and accelerated by said blades as the direction of flow of said liquid changes gradually from axial to centrifugal before said liquid is discharged in a nearly horizontal direction from said centrifugal flow inducing portion.

2. An apparatus as in claim 1, wherein said upper, centrifugal flow inducing portion is shaped in such a way that liquid which is pumped upwardly by said lower, screw pump portion is fed vertically into said upper portion and bent gradually into said spiral thus providing substantially horizontal movement at the outlet of said upper portion where said second velocity is a resultant of the peripheral speed of said upper portion and said first velocity.

3. An apparatus as in claim 1, further comprising a supporting means for said power drive, an intake section disposed around said lower portion, mounting means for said intake section, and spacers connecting said power drive supporting means with said mounting means, said spacers being shaped as inverting blades means for collecting a portion of the outlet liquid stream to cause said portion to change its direction to produce a reaction force against the force caused by centrifugal outlet of the liquid stream.

4. An apparatus according to claim 1, wherein the diameter of said at least one blade of said screw pump portion is substantially equal to the outer diameter of said at least one outwardly curved blade of said centrifugal flow inducing portion.

5. An apparatus according to claim 1, wherein the diameter of said at least one blade of said screw pump portion is greater than the outer diameter of said at least one outwardly curved blade of said centrifugal flow inducing portion.

6. An apparatus according to claim 1, wherein the diameter of said at least one blade of said screw pump portion is less than the outer diameter of said at least one outwardly curved blade of said centrifugal flow inducing portion.

* * * * *